Patented Mar. 30, 1943

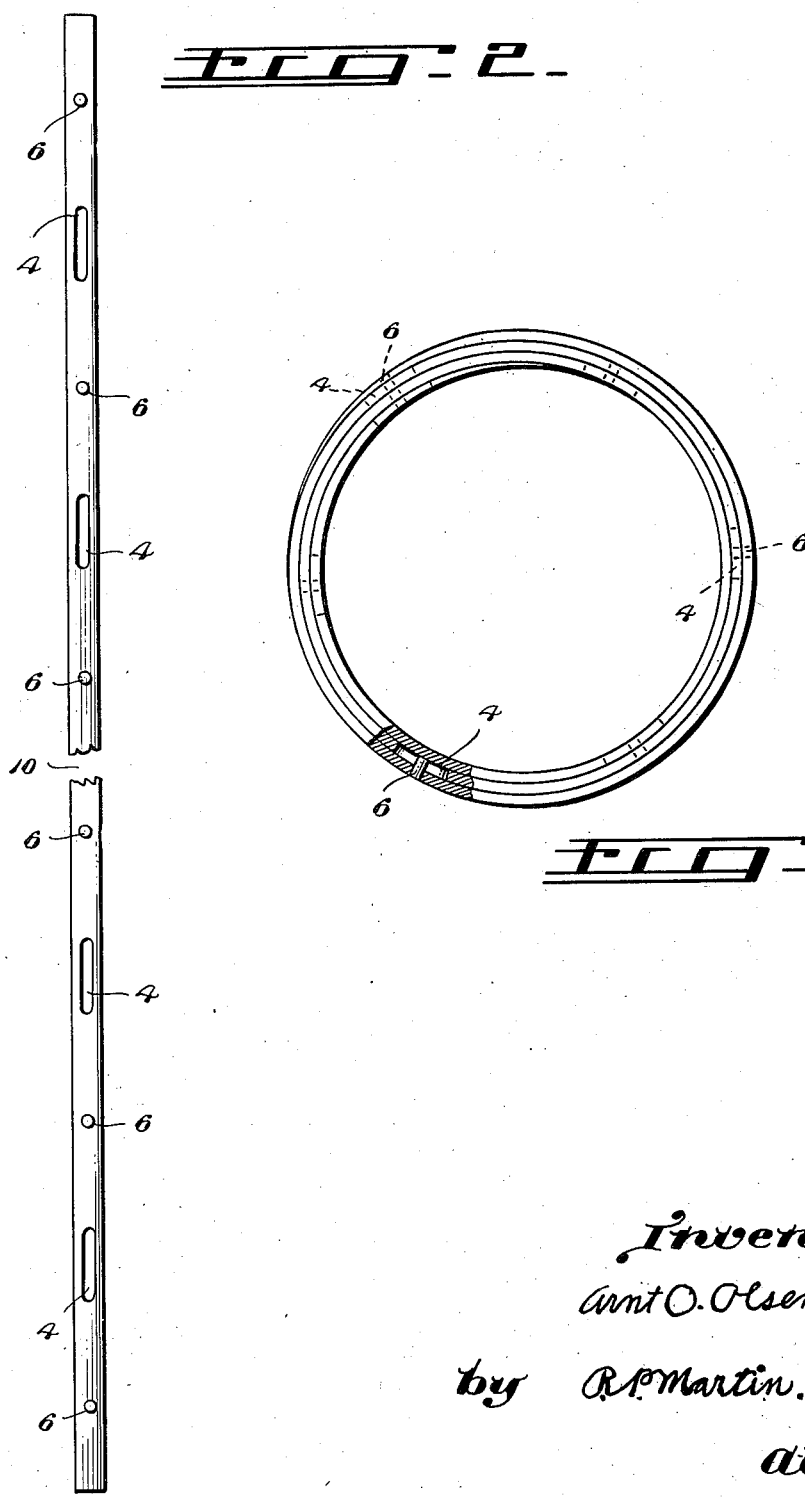

2,315,219

UNITED STATES PATENT OFFICE 2,315,219

COILED SPRING PISTON RING

Arnt Olaf Olsen, Seattle, Wash.

Application June 23, 1941, Serial No. 399,270

1 Claim. (Cl. 309—30)

My invention relates to improvements in coiled spring piston rings in which a flat spring provided with slots and pins operate in conjunction with a coiled spring; and the objects of my invention are, first, to provide a flat spring with slots and pins; second, to afford facilities for the proper guiding of said spring; and, third, to coil said spring, giving each coil a different diameter in spiral form.

I attain these objects by mechanism illustrated in the accompanying drawing, in which:

Figure 1 is an elevation of the piston ring.

Fig. 2 is an elevation of the flat spring disclosing apertures and pins to guide the piston ring in operation.

Similar numerals refer to similar parts throughout the several views.

Referring to the drawing in detail: numeral 4 indicates slots disclosed in Fig. 2, and are to receive pins indicated by numeral 6. At numeral 10 I have shown a broken space in the spring as the correct length is not given, but is shown in Figure 1, with each coil guided by the pins indicated at numeral 6.

The blowby of a piston ring usually occurs at its ends where the piston ring comes together; in the present ring this trouble is prevented as the butting of two ends are eliminated by ring coils having a greater area for contraction and expansion as pressure from the explosion travels into the piston ring groove. This causes the piston ring to hold down the oil on the intake stroke of the piston, when vacuum occurs.

In operation the coiled spring piston ring is placed in the ring groove in the piston and as the ring has two or more coils which give ample working clearance in said grooves to permit expansion of the ring when heated, as the piston moves back and forth reciprocating, the ring takes up a rotary movement on the piston; said rotary movement causes the sides of the ring and wall to wear. Said wearing of the ring is taken up in the expansion and increased length of the coiled spring in the ring, eliminating side play in the groove and knocking of the piston ring and leak or flow of fluid or carbon.

It will be understood that my invention is not limited to any particular kind of machine, but may be employed by any suitable engine.

What I claim as my invention, and desire to procure by Letters Patent is:

A piston ring comprising a plurality of concentric convolutions terminating in tapered ends on the inner and outer extremities, and guiding means for said convolutions consisting of pins rigidly fixed to and projecting radially from at least one of said convolutions, and engaged in slots in an adjacent convolution.

ARNT OLAF OLSEN.